(12) United States Patent
Murayama

(10) Patent No.: US 7,369,748 B2
(45) Date of Patent: May 6, 2008

(54) REPRODUCING APPARATUS AND TRACKING METHOD

(75) Inventor: Toshiyuki Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 737 days.

(21) Appl. No.: 10/890,600

(22) Filed: Jul. 14, 2004

(65) Prior Publication Data
US 2005/0013588 A1 Jan. 20, 2005

(30) Foreign Application Priority Data
Jul. 16, 2003 (JP) ............ P2003-275516

(51) Int. Cl.
H04N 5/91 (2006.01)
(52) U.S. Cl. .............. 386/80; 386/79; 386/88
(58) Field of Classification Search .......... 386/46, 386/78–80, 88, 113; 360/77.14; 341/95
See application file for complete search history.

(56) References Cited

U.S. PATENT DOCUMENTS 4,658,309 A * 4/1987 Yasuda et al. .......... 360/77.14
5,258,879 A * 11/1993 Shimotashiro et al. ... 360/77.14
5,365,232 A * 11/1994 Ido et al. .................. 341/95
5,751,890 A * 5/1998 Yamasaki et al. ......... 386/79

* cited by examiner

Primary Examiner—Thai Q. Tran
Assistant Examiner—Mishawn Dunn
(74) Attorney, Agent, or Firm—Frommer Lawrence & Haug LLP; William S. Frommer; Thomas F. Presson

(57) ABSTRACT

A reproducing apparatus comprises detecting means 18 and 19 for detecting levels of pilot signals recorded on tracks from reproduced signals reproduced by magnetic heads 1A, 1B, a calculating means 24 for calculating a ratio between levels detected by the detecting means 18 and 19 with respect to the pilot signals recorded on two tracks at both sides of the track traced by the magnetic heads 1A, 1B and a judging means 25 for judging an off-track amount of the magnetic head from the value of the ratio calculated by the calculating means 24, wherein tracking can be effected on the magnetic heads 1A, 1B in response to the off-track amount judged by the judging means 25. In a reproducing apparatus like a VCR (video cassette recorder) in which a magnetic head traces tracks on a tape-like recording medium, tracking can be effected on the magnetic head quickly in a short period of time.

6 Claims, 6 Drawing Sheets

REPRODUCING APPARATUS AND TRACKING METHOD

BACKGROUND OF THE INVENTION

1. Field of the Invention

The present invention relates to a reproducing apparatus for tracing tracks on a tape-like recording medium by a magnetic head and a magnetic head tracking method for use with such reproducing apparatus.

2. Description of the Related Art

In VCRs (video cassette recorders), tracking has so far been effected on a reproducing head by using a pilot signal recorded on tracks of a magnetic tape (see cited patent reference 1, for example).

FIG. 1 of the accompanying drawings is a block diagram showing an arrangement of a tracking system of a VCR according to the related art. As shown in FIG. 1, a pair of reproducing heads 1A, 1B is disposed on a rotary drum 2 with an angular extent of 180° in an opposing fashion. The reproducing heads 1A, 1B will be generally referred to as a "reproducing head 1" if necessary. The rotary drum 2 has a magnetic tape 3 wound thereon, and it allows the magnetic tape 3 to travel as it rotates. The reproducing heads 1A, 1B alternately trace the tracks on the magnetic tape 3.

FIG. 2 is a diagram showing the manner in which the reproducing head 1A reproduces pilot signals from the two tracks formed at both sides of the track to be traced at the same time it traces the tracks on the magnetic tape 3. As shown in FIG. 2, a track T1 is a track that is to be traced by the reproducing head 1A, and a track T2 is a track that is to be traced by the reproducing head 1B. Pilot signals P1 and P2 are alternately recorded on the track T2 of the magnetic tape 3.

As shown in FIG. 2, since each of the reproducing heads 1A, 1B is slightly wider than the width of the track, when the reproducing head 1A traces a certain track T1, it is unavoidable that the reproducing head 1A partly traces the two tracks T2 at both sides of a certain track T1. As is known well, so-called azimuth effect can prevent the reproducing head 1A from reproducing the signals from the track T2 at its portion in which video data and audio data are recorded. On the other hand, it is customary that the pilot signals P1, P2 are recorded by using frequencies considerably lower than those of video data and audio data such that they may become difficult to be affected by the azimuth effect (in that case, the pilot signals P1, P2 may have frequencies f1, f2 which are different from each other). Therefore, the reproducing head 1A is able to reproduce the pilot signals P1, P2 at the same time it is tracing the track T1.

Referring back to FIG. 1, reproduced RF (radio frequency) signals that have been reproduced from the magnetic tape 3 by the reproducing heads 1A, 1B are amplified by a playback amplifier (not shown) and inputted to a 2-input and 1-output switch 4a. The switch 4a is supplied with a head switching signal whose polarity goes to "L" (low) level when the reproducing head 1A scans the track and whose polarity goes to "H" (high) level when the reproducing head 1B scans the track from a suitable means such as a microprocessor (not shown) as a control signal. The switch 4a selectively outputs the reproduced RF signals reproduced by the reproducing heads 1A, 1B when the head switching control signal is held at "L" (low) level and "H" (high) level so that it may output the reproduced RF signals in the form of a time-series reproduced RF signal.

The reproduced RF signal in the form of the time-series reproduced RF signal is supplied to a video data/audio data band pass filter (video data/audio data BPF) 5 and is also supplied to a 1-input and 1-output switch 4b. Video data and audio data outputted from the band pass filter 5 are supplied to video data and audio data signal processing systems (not shown). The switch 4b is supplied with the aforementioned head switching signal as the control signal, and only when the head switching signal is held at "L" (low) level, the switch 4b is turned on to supply the reproduced RF signals to a pilot signal P1 band pass filter (pilot signal P1 BPF) 6 that is used to output the signal with the frequency f1) and a pilot signal P2 band pass filter (pilot signal P2 BPF) 7 that is used to output the signal with the frequency f2.

The pilot signals P1, P2 outputted from the band pass filters 6, 7 are respectively envelope-detected by envelope detecting circuits 8, 9 and supplied to analog-to-digital (A/D) converters 10, 11 in which they are converted in the form of analog to digital signals. Then, a subtracter 12 calculates a difference between an A/D-converted value of an envelope level of the pilot signal P1 and an A/D-converted value of an envelope level of the pilot signal P2, and an output from the subtracter 12 is supplied to a low-pass filter (LPF) 13 and thereby a tracking error signal is generated.

When the reproducing head 1 is accurately tracing a target track (when the reproducing head 1 is properly tracing a target track), the envelope level of the pilot signal P1 and that of the pilot signal P2 become identical to each other, and hence a tracking signal is canceled out. When on the other hand the reproducing head 1 is not properly tracing a target track, that is, so-called off-track occurs, the envelope level of the pilot signal P1 and that of the pilot signal P2 become different from each other, and hence the tracking error signal is not canceled out. This tracking error signal is added to a capstan control signal that a capstan control unit 14 supplies to a capstan motor 16.

Upon playback, the capstan control unit 14 detects a phase of a capstan based upon a phase difference between a reference pulse generated from a reference pulse generating unit (not shown) and a reproduced CTL pulse reproduced from the magnetic tape 3 by a CTL (control) reproducing head 15 and also detects a velocity of the capstan based upon a capstan pulse signal FG from the capstan motor 16. Then, the capstan control unit 14 generates a capstan control signal based upon the thus detected capstan phase and the thus detected capstan velocity. The tracking error signal is added to this capstan control signal, whereby the phase of the reproduced CTL pulse is controlled so as to cancel the tracking error signal out (that is, the phase of the reproduced CTL pulse is controlled so that the off-track may be corrected).

[Cited Patent Reference 1]

Japanese laid-open patent application No. 9-81991 (see paragraphs [0002] to [0009] and paragraphs [0017] to [0022] and also see FIG. 1 and FIGS. 7 to 11)

However, the above-mentioned related-art tracking system cannot avoid a defect in which tracking cannot be effected on the magnetic head rapidly in a short period of time. The reasons for this will be described below.

In the related-art tracking system, a practical value of an off-track amount (i.e. tracking displacement amount) cannot be detected from the value of the difference between the envelope level of the pilot signal P1 and the envelope level of the pilot signal P2. For example, having considered the case (a) in which the envelope levels of the pilot signals P1, P2 obtained when the reproducing head 1 properly traces the track are both held at 1V and the case (b) in which the envelope levels of the pilot signals P1, P2 obtained when the reproducing head 1 properly traces the track are both held at 2V, it is to be understood that a value of a difference between the envelope levels obtained when an off-track of a constant amount occurs in the reproducing head 1 differs in the cases (a) and (b). In this case, a value of a difference obtained in the case (b) becomes twice as large as that obtained in the case of (a).

As described above, according to the related-art tracking system, it is to be detected that "the reproducing head 1 is not properly tracing the track (that is, off-track occurs in the reproducing head 1) if the value of the difference between the envelope levels is not zero". In addition, the direction of the off-track also can be detected from the symbol of the difference (that is, plus (+) or minus (−)). In this case, since the absolute tracking displacement amount is not known and the phase of the reproduced CTL signal should be progressively changed little by little until the difference of the envelope level is canceled out, and hence the tracking of the reproducing head 1 needs plenty of time. When the tracking of the reproducing head 1 should be completed within a constant time period such as a pre-roll time required in the VCR edit operation, if the tracking of the reproducing head 1 takes a lot of time as described above, there arise problems.

Further, since the related-art tracking system requires the band pass filters and the envelope detecting circuits of the two systems (that is, the band pass filter 6, the envelope detecting circuit 8 and the band pass filter 7, the envelope detecting circuit 9) in order to obtain the envelope levels of the pilot signals P1, P2 with the frequencies f1, f2 which are different from each other, the hardware of the above-mentioned reproducing apparatus and the hardware of such related-art tracking system become complex unavoidably.

SUMMARY OF THE INVENTION

In view of the aforesaid aspect, it is an object of the present invention to provide a reproducing apparatus such as a VCR (video cassette recorder) for tracing tracks on a tape-like recording medium by a magnetic head in which tracking can be effected on a magnetic head quickly in a short period of time.

It is other object of the present invention to provide a reproducing apparatus in which tracking can be effected on a magnetic head by a simple arrangement.

It is a further object of the present invention to provide a tracking system in which tracking can be effected on a magnetic head quickly in a short period of time.

It is yet a further object of the present invention to provide a tracking system in which tracking can be effected on a magnetic head by a simple arrangement.

According to an aspect of the present invention, there is provided a reproducing apparatus for tracing tracks on a tape-like recording medium by a magnetic head. This reproducing apparatus is comprised of a detecting means for detecting levels of pilot signals recorded on tracks from a reproduced signal reproduced by the magnetic head, a calculating means for calculating a ratio between levels detected by the detecting means with respect to pilot signals recorded on two tracks at both sides of a track to be traced by the magnetic head and a judging means for judging an off-track amount of the magnetic head from a value of a ratio calculated by the calculating means, wherein tracking is effected on the magnetic head in response to an off-track amount judged by the judging means.

According to this reproducing apparatus, when the levels of the pilot signals recorded on the two tracks at both sides of the track to be traced by the magnetic head are respectively detected, the ratio between the levels of the two pilot signals is calculated. Then, the off-track amount of the magnetic head is judged from the value of that ratio, and tracking can be effected on the magnetic head in response to the off-track amount.

The value of the ratio between the levels of the pilot signals recorded on the two tracks at both sides of the track to be traced becomes the value that may be uniquely determined by the off-track amount of the magnetic head regardless of the level of the pilot signal obtained when the magnetic head properly traces the track. Accordingly, since the practical value of the off-track amount can be judged by calculating the value of the ratio, tracking for wholly correcting the off-track of the magnetic head can be effected on the magnetic tape in response to the thus judged off-track amount at the same time. Consequently, it becomes possible to quickly effect tracking on the magnetic head in a short period of time.

In this reproducing apparatus, by way of example, it is suitable that the calculating means may calculate the ratio in such a manner that a smaller level of the levels detected by the detecting means with respect to the pilot signals recorded on the two tracks at both sides of the track to be traced may become the denominator.

As a result, since the value of the ratio to be calculated becomes constantly greater than 1, the resolution of the value of the ratio relative to the off-track amount may become equal regardless of the direction of the off-track of the magnetic head, and in addition, it becomes possible to obtain a large resolution. Accordingly, it becomes possible to effect highly-precise tracking on the magnetic head regardless of the direction of the off-track.

Further, in this reproducing apparatus, by way of example, it is suitable that the judging means may be composed of a table which stores therein the value of the ratio and the off-track amount in correspondence with each other.

As a result, it becomes possible to quickly and easily judge the off-track amount as compared with the case in which each off-track amount is individually calculated from the value of the thus calculated ratio.

Further, in this reproducing apparatus, by way of example, the tape-like recording medium has recorded thereon a pilot signal with a frequency of only one kind in such a pattern that pilot signals exist only on a track of one side of two tracks at both sides of a track to be traced when one magnetic head of two magnetic heads disposed on a rotary drum in an opposing fashion traces a track and that pilot signals exist on the opposite track of two tracks at both sides of the track to be traced when the other magnetic head traces a track. The magnetic head comprises two magnetic heads disposed on a rotary drum in an opposing fashion, the detecting means comprises only detecting means for detecting a level of the pilot signal component with the frequency of only one kind and in which the reproducing apparatus further comprises a holding means for holding a level detected by the detecting means with respect to the pilot signal recorded on the track of one side until the level of the pilot signal recorded on the track of the opposite side is detected by the detecting means (the holding means holds the level of the pilot signal detected by the detecting means from the reproduced signal reproduced by one magnetic head of the opposing two magnetic heads until the level of the pilot signal is detected by the detecting means from the reproduced signal reproduced by the other magnetic head of the two magnetic heads). It is suitable that the calculating means may calculate a ratio between the level held by the holding means and the level detected by the detecting means with respect to the pilot signal recorded on the track of the opposite side (that is, the level of the pilot signal detected by the detecting means from the reproduced signal reproduced by the other magnetic head).

In consequence, only the detecting means of one system can detect the level of the pilot signal from the signals alternately reproduced from the tape-like recording medium on which the pilot signal with the frequency of only one kind is recorded by the opposing two magnetic heads.

Then, the level of the pilot signal detected from the reproduced signal reproduced by one magnetic head is held until the level of the pilot signal is detected from the reproduced signal reproduced by the other magnetic head, and the ratio between the thus held level and the level of the pilot signal detected from the reproduced signal reproduced by the other magnetic head is calculated. Then, the off-track amount of the magnetic head is judged from the value of that ratio, and tracking can be effected on the magnetic head in response to the off-track amount.

As described above, since it is sufficient to provide only the detecting means of one system in order to obtain the level of the pilot signal with the frequency of only one kind, it becomes possible to effect tracking on the magnetic head quickly in a short period of time and in addition, it becomes possible to effect tracking on the magnetic head by the simple hardware.

According to another aspect of the present invention, there is provided a magnetic head tracking method in a reproducing apparatus for tracing tracks on a tape-like recording medium by a magnetic head. This tracking method is comprised of the steps of a first step for detecting levels of pilot signals recorded on tracks from a reproduced signal reproduced by the magnetic head, a second step for calculating a ratio between the levels detected at the first step with respect to the pilot signals recorded on two tracks at both sides of the track to be traced by the magnetic head, a third step for judging an off-track amount of the magnetic head from a value of a ratio calculated at the second step, and a fourth step for effecting tracking on the magnetic head in response to the off-track amount judged at the third step.

In this tracking method, the second step calculates a ratio between the pilot signals recorded on the two tracks in such a manner that a smaller level of the levels detected at the first step becomes a denominator.

Further, according to this tracking method, the third step judges the off-track amount with reference to a table in which the value of the ratio and the off-track amount are stored in correspondence with each other.

Furthermore, according to this tracking method, the tape-like recording medium has recorded thereon a pilot signal with a frequency of only one kind in such a pattern that pilot signals exist only on a track of one side of two tracks at both sides of a track to be traced when one magnetic head of two magnetic heads disposed on a rotary drum in an opposing fashion traces a track and that pilot signals exist on the opposite track of two tracks at both sides of the track to be traced when the other magnetic head traces a track. The magnetic head comprises two magnetic heads disposed on a rotary drum in an opposing fashion. The first step detects a level of the pilot signal component with the frequency of only one kind. This tracking method further includes a fifth step for holding a level detected at the first step with respect to the pilot signal recorded on the track of one side until the level of the pilot signal recorded on the track of the opposite side is detected at the first step and the second step calculates a ratio between the level held at the fifth step and the level detected at the first step with respect to the pilot signal recorded on the track of said opposite side.

According to this tracking method, in exactly the same manner as that has been described so far with reference to the aforementioned reproducing apparatus of the present invention, it becomes possible to effect tracking on the magnetic head quickly in a short period of time, it becomes possible to effect highly-precise tracking on the magnetic head regardless of the off-track of the magnetic head, it becomes possible to judge the off-track amount quickly and easily, and it becomes possible to effect tracking on the magnetic head by the simple hardware.

According to the present invention, in the reproducing apparatus in which the tracks on the tape-like recording medium are traced by the magnetic head, since the practical value of the off-track amount can be judged by calculating the ratio between the levels of the pilot signals recorded on the two tracks at both sides of the track to be traced regardless of the level of the pilot signal, there can be achieved an effect in which tracking can be effected on the magnetic head quickly in a short period of time.

Also, since the resolution of the value of the ratio relative to the off-track amount becomes equal regardless of the direction of the off-track of the magnetic head and in addition the large resolution can be obtained, there can be achieved an effect in which highly-precise tracking can be effected on the magnetic head regardless of the direction of the off-track of the magnetic head.

Further, by using the table in which the values of the ratios and the off-track amounts are stored in correspondence with each other, there can be achieved an effect in which the off-track amount can be judged quickly and easily.

Furthermore, since it is sufficient to provide only the detecting means of one system in order to detect the level of the pilot signal with the frequency of only one kind, there can be achieved an effect in which tracking can be effected on the magnetic head by the simple hardware.

DESCRIPTION OF THE PREFERRED EMBODIMENTS

Figure 1:
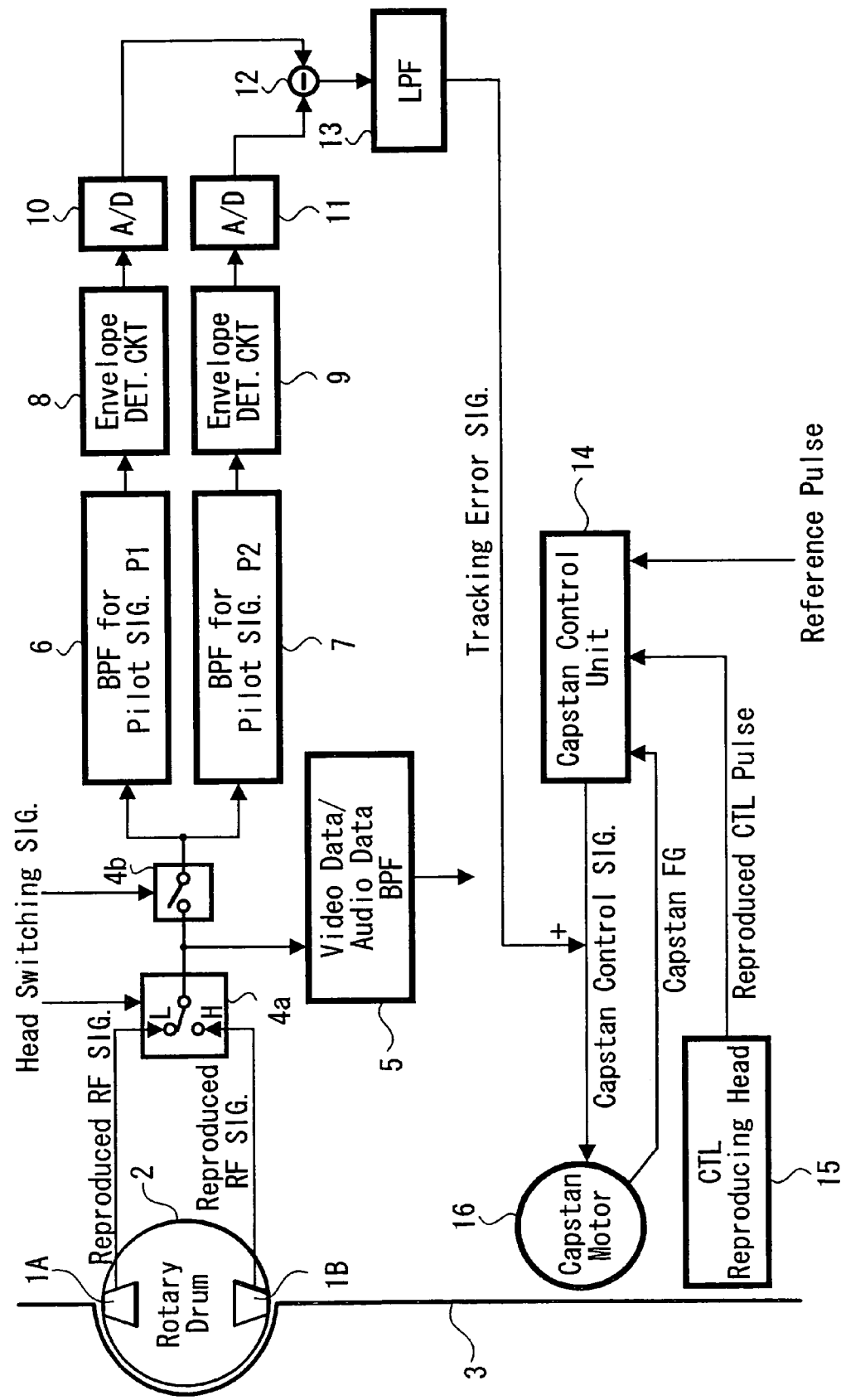
FIG. 1 is a block diagram showing an example of an arrangement of a tracking system for use with a VCR (video cassette recorder) according to the related art.
Figure 3:
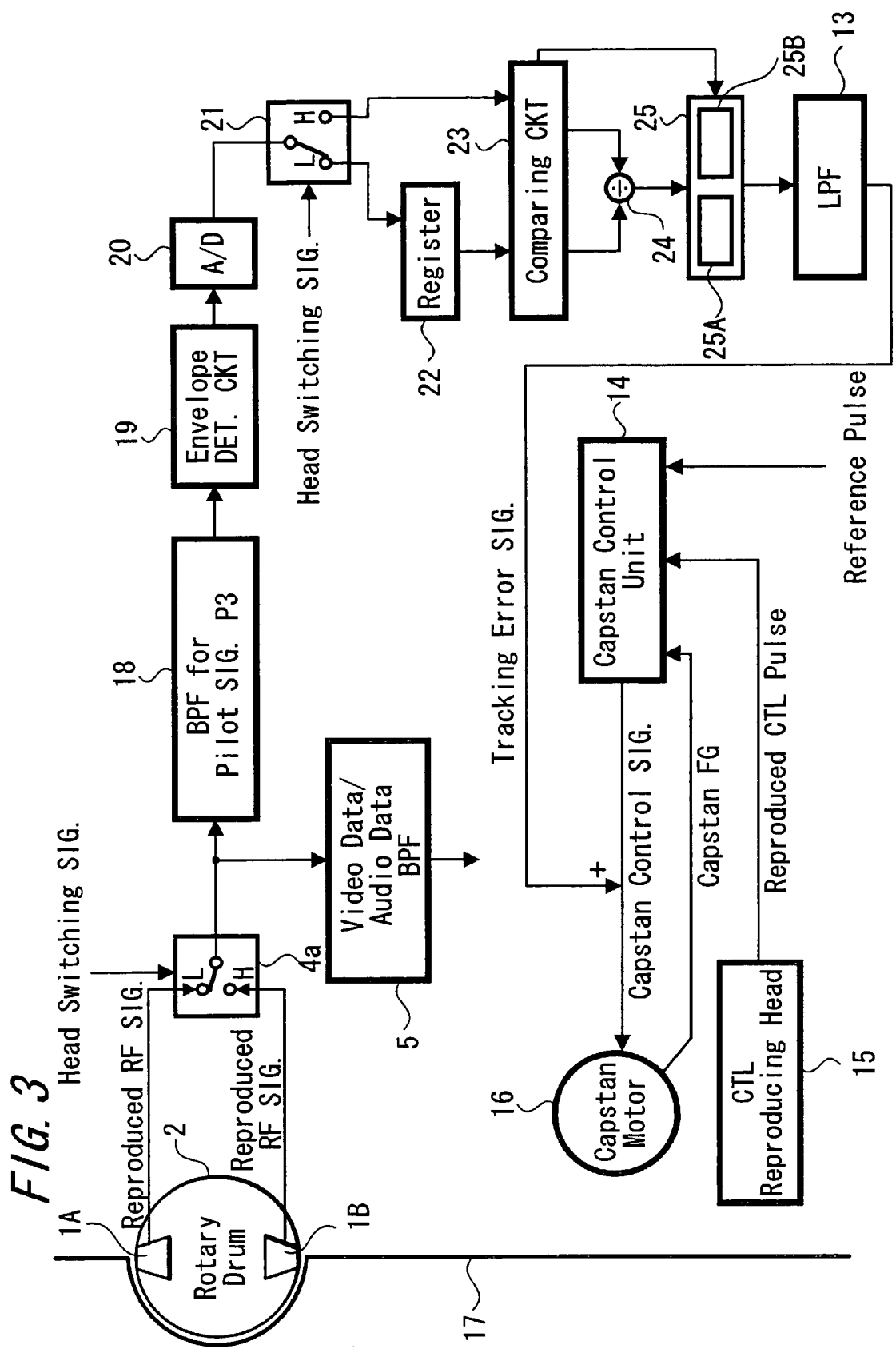
FIG. 3 is a block diagram showing an example of an arrangement of a tracking system for use with a VCR according to an embodiment of the present invention.

An embodiment in which the present invention is applied to a VCR will be described below with reference to the accompanying drawings. FIG. 3 is a block diagram showing an arrangement of a tracking system for use with a VCR according to an embodiment of the present invention. In FIG. 3, elements and parts identical to those of FIG. 1 are denoted by the identical reference numerals.

Referring to FIG. 3, a pair of reproducing heads 1A, 1B is disposed on the rotary drum 2 with an angular extent of 180° in an opposing fashion. The reproducing heads 1A, 1B will be generally referred to as a "reproducing head 1" if necessary. The rotary drum 2 has the magnetic tape 3 wound thereon and allows the magnetic tape 3 to run as it rotates. The reproducing heads 1A, 1B alternately trace the tracks on the magnetic tape 3.

Figure 4:
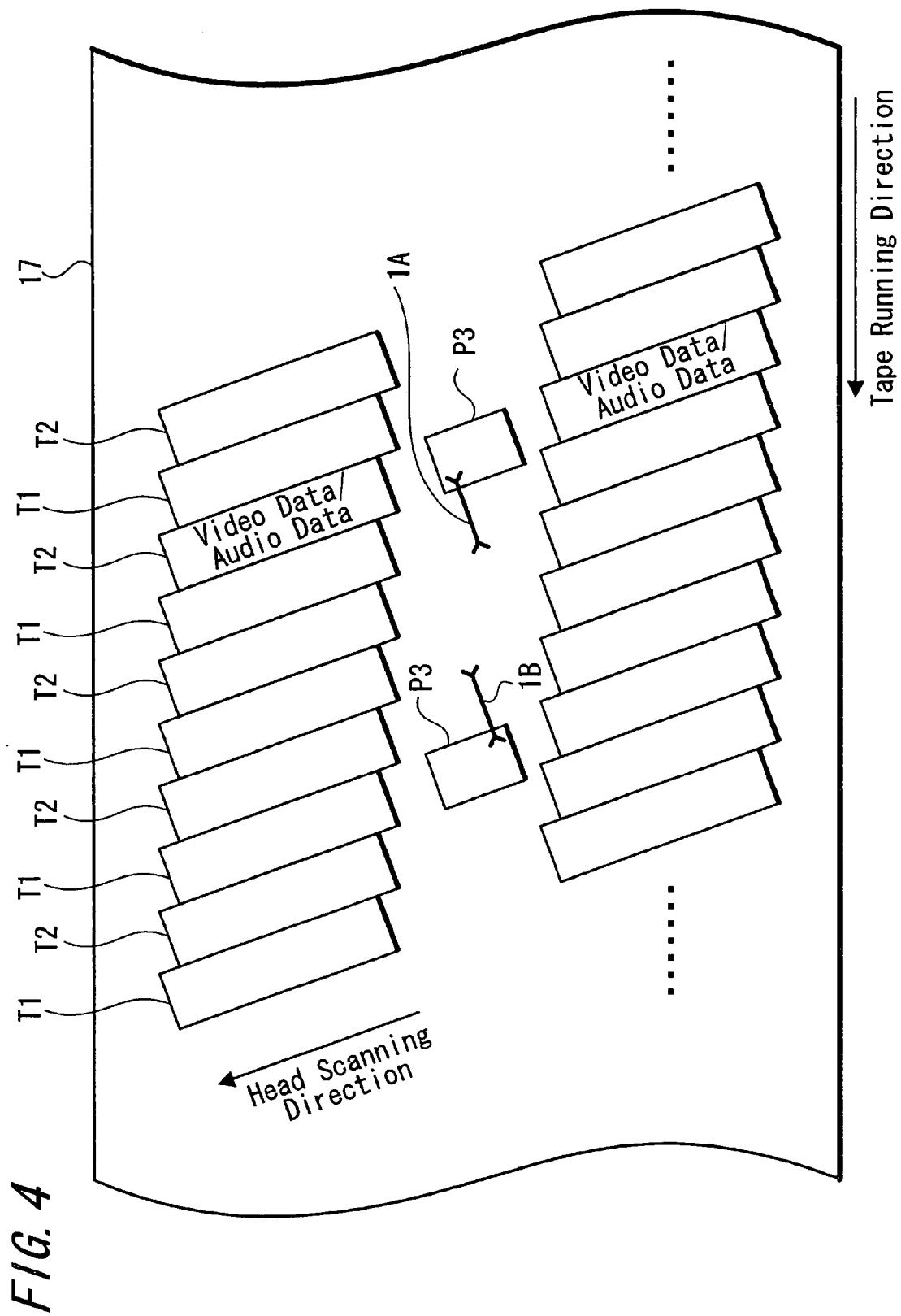
FIG. 4 is a diagram showing recorded patterns of pilot signals on tracks of a magnetic tape that should be reproduced by the VCR according to the present invention.

FIG. 4 is a diagram showing a recording pattern of a pilot signal on the magnetic tape 3 that is to be reproduced by the VCR to which the present invention is applied. As shown in FIG. 4, a track T1 is a track that is to be traced by the reproducing head 1A, and a track T2 is a track that is to be traced by the reproducing head 1B. Only a pilot signal P3 having one kind of a frequency f3 (this frequency f3 is considerably lower than those of video data and audio data) is recorded on the tracks with such a pattern that, when the reproducing head 1A scans the tracks, the pilot signal P3 may be located on the track T2 on the upper side (on the right-hand side of FIG. 4) of the track T1 to be traced and that, when the reproducing head 1B scans the tracks, the pilot signal P3 may be located on the track T1 on the lower side (on the left-hand side of FIG. 4) of the track T2 to be traced.

Referring back to FIG. 3, reproduced RF signals reproduced from the magnetic tape 3 by the reproducing heads 1A, 1B are amplified by a playback amplifier (not shown) and supplied to the 2-input and 1-output switch 4a. The switch 4a is supplied with the head switching signal of which polarity goes to "L" (low) level when the reproducing head 1A scans the tracks and whose polarity goes to "H" (high) level when the reproducing head 1B scans the tracks as the control signal from a suitable means such as a microprocessor (not shown). The switch 4a selectively outputs the reproduced RF signals obtained by the reproducing heads 1A, 1B when the head switching signal is held at "L" (low) level and "H" (high) level and thereby the switch 4a outputs the reproduced RF signals in the form of a time-series reproduced RF signal.

The reproduced RF signal that was outputted in the form of the time-series reproduced RF signal is supplied to the video data and audio data band pass filter (video data/audio data BPF) 5 and a pilot signal P3 band pass filter (pilot signal P3 BPF) 18 which is used to obtain a signal with a frequency f3. Video data and audio data outputted from the band pass filter 5 are supplied to a video data and audio data signal processing system (not shown).

The pilot signal P3 outputted from the band pass filter 18 is envelope-detected by an envelope detecting circuit 19 and supplied to an A/D (analog-to-digital) converter 20, in which it is converted in the form of an analog to digital signal.

Figure 5:
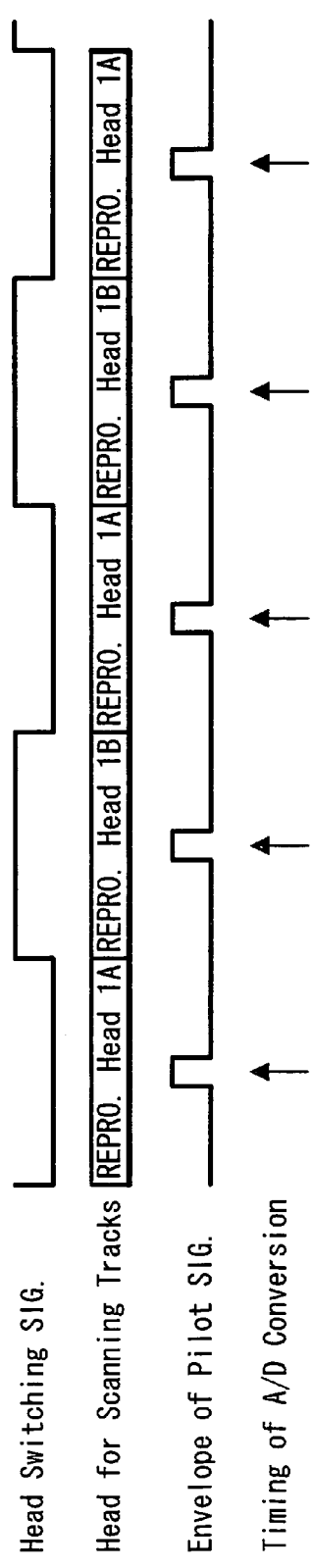
FIG. 5 is a timing chart showing timing at which an A/D-converted value of an envelope level of a pilot signal is acquired in the tracking system shown in FIG. 3.

FIG. 5 is a timing chart showing timing at which the A/D converter 20 outputs an A/D-converted value of an envelope level of the pilot signal P3. When the polarity of the head switching signal is held at "L" (low) level (that is, when the reproducing head 1A scans the tracks), the reproduced RF signal reproduced by the reproducing head 1A is outputted from the switch 4a, and an A/D-converted value of the envelope level of the pilot signal P3 in this reproduced RF signal calculated by the band pass filter 18 and the envelope detecting circuit 19 is A/D-converted (analog-to-digital-converted) by the A/D converter 20 (this A/D-converted value will hereinafter be referred to as an "A/D-converted value of the reproducing head 1A").

When on the other hand the polarity of the head switching signal is held at "H" (high) level (that is, when the reproducing head 1B scans the tracks), the reproduced RF signal reproduced by the reproducing head 1B is outputted from the switch 4a, and the envelope level of the pilot signal P3 in the reproduced RF signal obtained from the band pass filter 18 and the envelope detecting circuit 19 is A/D-converted (analog-to-digital-converted) by the A/D converter 20 (this A/D-converted value will hereinafter be referred to as an A/D-converted value of the reproducing head 1B").

Referring back to FIG. 3, the A/D-converted value of the envelope level of the pilot signal P3 from the A/D converter 20 is inputted to a 1-input and 2-output switch 21. One output terminal 21a of the switch 21 is connected to a register 22, and the other output terminal 21b of the switch 21 is connected to a comparing circuit 23.

The switch 21 also is supplied with the head switching signal whose polarity goes to "L" (low) level when the reproducing head 1A scans the tracks and whose polarity goes to "H" (high) level when the reproducing head 1B scans the tracks as the control signal similarly to the switch 4a. The switch 21 supplies the inputted A/D-converted value ("the A/D-converted value of the reproducing head 1A" that has been so far described with reference to FIG. 5) to the register 22 when the head switching signal is held at "L" (low) level and supplies the inputted A/D-converted value ("A/D-converted value of the reproducing head 1B" that has been so far described with reference to FIG. 5) to the comparing circuit 23 when the head switching signal is held at "H" (high) level.

The register 22 holds this A/D-converted value of the reproducing head 1A until the reproducing head 1A scans the tracks next time. The comparing circuit 23 compares the magnitudes of "the A/D-converted value of the reproducing head 1A" stored in the register 22 and "the A/D-converted value of the reproducing head 1B" inputted thereto from the switch 21. If "the A/D-converted value of the reproducing head 1A"≧"the A/D-converted value of the reproducing head 1B" is satisfied, then this comparing circuit 23 supplies "the A/D-converted value of the reproducing head 1A" and "the A/D-converted value of the reproducing head 1B" to a divider 24 at the succeeding stage in such a manner that a value of a ratio of "the A/D-converted value of the reproducing head 1A"/"the A/D-converted value of the reproducing head 1B" in which "the A/D-converted value of the reproducing head 1B" becomes a denominator" may be calculated. If on the other hand the "the A/D-converted value of the reproducing head 1A"<"the A/D-converted value of the reproducing head 1B" is satisfied, then the comparing circuit 23 supplied "the A/D-converted value of the reproducing head 1A" and "the A/D-converted value of the reproducing head 1B" to the divider 24 in such a manner that a value of a ratio of "the A/D-converted value of the reproducing head 1B"/"the A/D-converted value of the reproducing head 1A" in which the "A/D-converted value of the reproducing head 1A" becomes a denominator may be calculated.

As a result, the divider 24 calculates the ratio between "the A/D-converted value of the reproducing head 1A" and "the A/D-converted value of the reproducing head 1B", and this value of the ratio becomes constantly greater than 1. A point at which this value of the ratio can become constantly greater than 1 will hereinafter be referred to as an "scheme 1".

Figure 6:
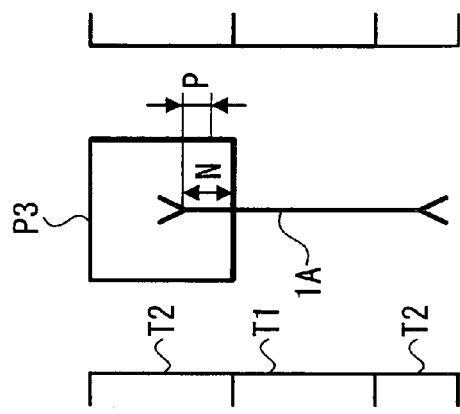
FIG. 6 is a diagram showing duration of a time in which a reproducing head is reproducing a pilot signal and an off-track amount of the reproducing head.

The value of the ratio between "the A/D-converted value of the reproducing head 1A" and "the A/D-converted value of the reproducing head 1B" becomes a value which may be uniquely determined by the off-track amounts of the magnetic heads 1A, 1B regardless of the magnitude of the envelope level of the pilot signal P3 obtained when the magnetic head properly scans the track. This will be described below with reference to FIG. 6. FIG. 6 is a diagram showing a length in which the reproducing head traces the pilot signal and the off-track amount of the reproducing head.

In FIG. 6, N (μm) assumes a length in which the reproducing head 1A traces the pilot signal P3 when the reproducing head 1A properly traces the track. If the reproducing head 1A is displaced to the lower side by an off-track amount of P (μm), then the ratio of the length in which the reproducing head 1A traces the pilot signal P3 decreases to (N−P)/N times. Assuming now that the envelope level of the pilot signal P3 obtained when the reproducing head 1A properly traces the track is E (V), then "the A/D-converted value of the reproducing head 1A" obtained at that time is expressed by the following equation (1):

"A/D-converted value of the reproducing head $1A$"=$E \times (N-P)/N$ (1)

At that time, since the length in which the reproducing head 1B traces the pilot signal P3 increases P, the ratio in which the reproducing head 1B traces the pilot signal P3 increases to (N+P)/N times. Thus, "the A/D-converted value of the reproducing head 1B" is expressed by the following equation (2):

"A/D-converted value of the reproducing head $1B$"=$E \times (N+P)/N$ (2)

Therefore, the value of the ratio between "the A/D-converted value of the reproducing head 1A" and "the A/D-converted value of the reproducing head 1B" is expressed by the following equation (3):

Ratio=$(N-P)/(N+P)$ (3)

Since N is a constant, the value of this ratio can be uniquely determined by P, that is, the off-track amount, and it is not affected by the envelope level of the pilot signal P3 obtained when the reproducing head properly traces the track. In other words, if the value of the ratio between "the A/D-converted value of the reproducing head 1A" and "the A/D-converted value of the reproducing head 1B" is obtained, then, since a practical value of the off-track amount can be judged, it becomes possible to effect tracking on the magnetic head in which the off-track can be corrected thoroughly in response to the thus judged off-track amount.

Referring back to FIG. 3, the value of the ratio calculated by the divider 24 is supplied to a table 25, which is composed of a ROM (read-only memory), as a read address. The table 25 has stored therein data of an off-track amount (that is, the off-track amount calculated from the above-described equation (3)) corresponding to the address by using the value of this ratio as the address.

Since the value of this ratio constantly becomes greater than 1 owing to the aforementioned "the scheme 1" regardless of the relationship between the magnitudes of "the A/D-converted value of the reproducing head 1A" and "the A/D-converted value of the reproducing head 1B" (that is, regardless of the direction of the off-track), the table 25 is contains a table 25A which stores therein data of the off-track amount obtained when the reproducing heads 1A, 1B are displaced to the lower side and a table 25B which stores therein data of the off-track amount obtained when the reproducing heads 1A, 1B are displaced to the upper side while the value of the same ratio is being used as the address.

Figure 7:
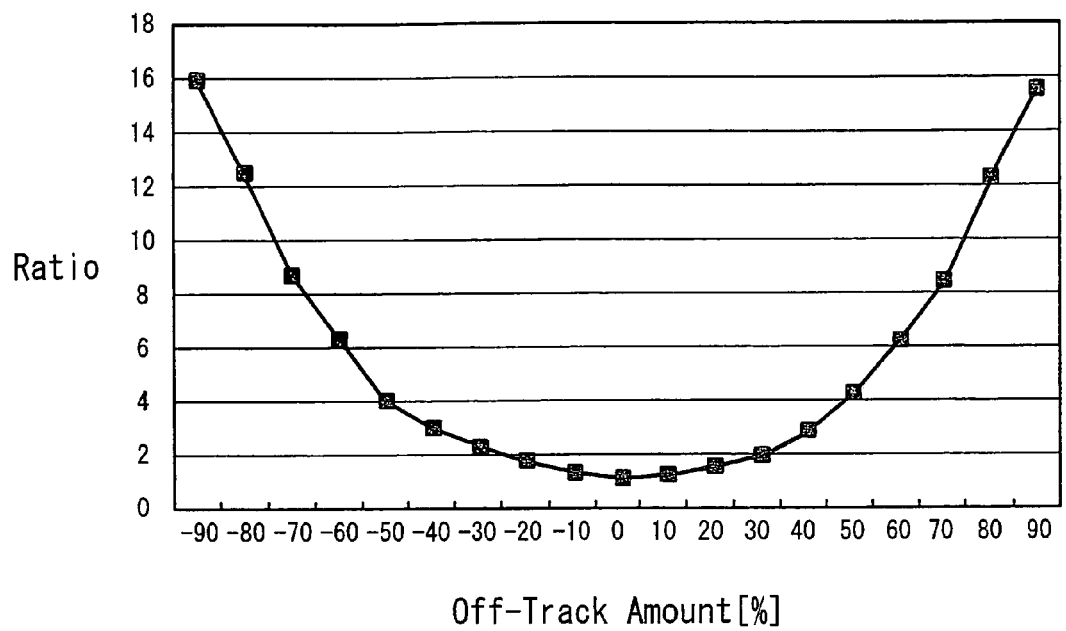
FIG. 7 is a diagram showing a relationship between the off-track amount and the value of the ratio stored within a table in the tracking system shown in FIG. 3.

FIG. 7 is a diagram showing a relationship between the data of the off-track amount and the value of the ratio in this table 25. Data in which the off-track amount is in the plus (positive) direction are data stored in the table 25A (that is, data of the off-track amounts obtained when the reproducing heads 1A, 1B are displaced in the lower side). On the other hand, data in which the off-track amount is in the minus (negative) direction are data stored in the table 25B (that is, data of the off-track amounts obtained when the reproducing heads 1A, 1B are displaced in the upper side).

As shown in FIG. 7, owing to "the scheme 1" by which the value of the ratio between "the A/D-converted value of the reproducing head 1A" and "the A/D-converted value of the reproducing head 1B" to be calculated is made constantly greater than 1, the resolution of the value of the ratio of the off-track amount becomes equal regardless of the direction of the off-track, and in addition, a large resolution can be obtained. Accordingly, it becomes possible to effect highly-precise tracking on the magnetic head regardless of the direction of the off-track.

Figure 8:
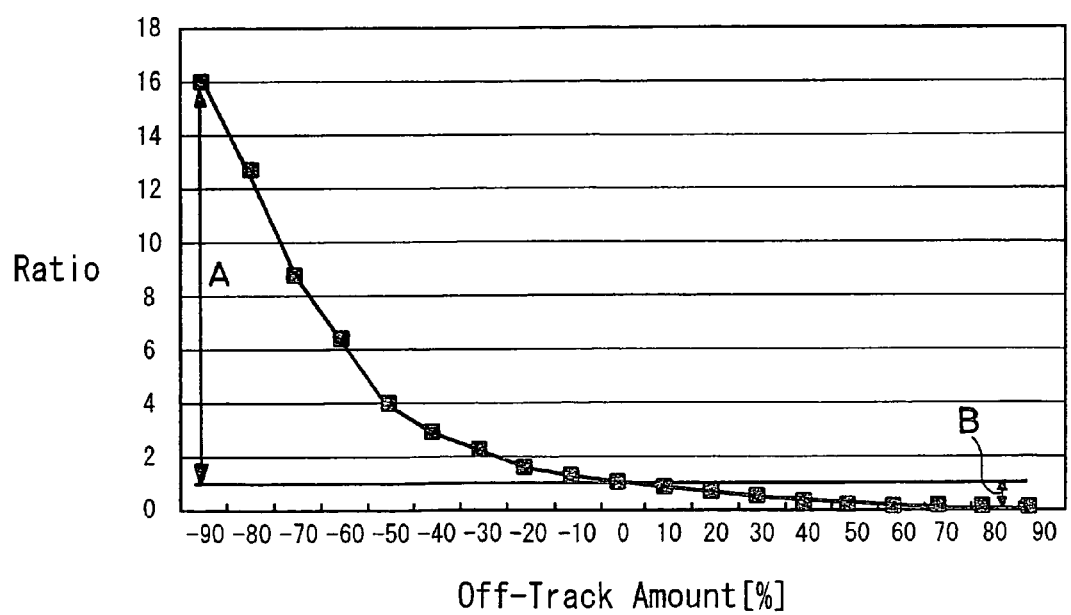
FIG. 8 is a diagram showing a relationship between the off-track amount and the value of the ratio obtained when "scheme 1" is not carried out.

FIG. 8 is a diagram showing an example of a relationship between the data of the off-track amount and the value of the ratio obtained on the assumption that this "scheme 1" is not carried out. In this case, when the off-track amount is in the minus (negative) direction (that is, when the reproducing heads 1A, 1B are displaced in the upper side), a resolution of the value of the ratio relative to the off-track amount is obtained as a width shown by "A" in FIG. 8. When the off-track amount is in the plus (positive) direction (that is, when the reproducing heads 1A, 1B are displaced in the lower side), a resolution of the value of the ratio relative to the off-track amount is obtained as a width shown by "B" in FIG. 8.

Therefore, in this case, when the reproducing heads 1A, 1B are displaced in the lower side, since the resolution of the value of the ratio relative to the off-track amount decreases, it becomes difficult to effect highly-precise tracking on the magnetic head.

Referring back to FIG. 3, a signal indicative of a compared result of the relationship of the magnitude between "the A/D-converted value of the reproducing head 1A" and "the "A/D-converted value of the reproducing head 1B" is supplied from the comparing circuit 23 to the table 25. If this compared result from the comparing circuit 23 indicates that "the A/D-converted value of the reproducing head 1A"≧"the A/D-converted value of the reproducing head 1B" is satisfied, then data of the off-track amount corresponding to the value of the ratio "the A/D-converted value of the reproducing head 1A"/"the A/D-converted value of the reproducing head 1B" calculated by the divider 24 (that is, the data in which the off-track amount is in the minus (negative) direction in FIG. 7) is read out from the table 25B of the table 25.

If on the other hand the compared result from the comparing circuit 23 indicates that "the A/D-converted value of the reproducing head 1A"<"the A/D-converted value of the reproducing head 1B" is satisfied, then data of the off-track amount corresponding to the value of the ratio "the A/D-converted value of the reproducing head 1B"/"the A/D- converted value of the reproducing head 1A" calculated by the divider 24 (that is, data in which the off-track amount is in the plus (positive) direction in FIG. 7) is read out from the table 25A of the table 25.

Then, the data indicative of the off-track amount read out from the table 25 is supplied to the low-pass filter (LPF) 13 and thereby a tracking error signal is generated. As a consequence, there is generated a tracking error signal that is used to wholly correct the off-track of the reproducing head 1 in response to the off-track amounts of the reproducing heads 1A, 1B. This tracking error signal is added to the capstan control signal which is supplied from the capstan control unit 14 to the capstan motor 16.

The capstan control unit 14 detects the phase of the capstan based upon the phase difference between the reference pulse from the reference pulse generating unit (not shown) and the reproduced CTL (control) pulse reproduced from the magnetic tape 3 by the CTL reproducing head 15 upon reproduction. At the same time, the capstan control unit 14 detects the velocity of the capstan based upon the capstan pulse signal FG from the capstan motor 16, and it generates the capstan control signal based upon the thus detected capstan phase and capstan velocity. The tracking error signal is added to this capstan control signal, whereby the phase of the reproduced CTL pulse is controlled in such a manner that this tracking error signal may be canceled out completely at the same time.

As described above, according to this tracking system of the present invention, since the practical value of the off-track amount can be judged regardless of the levels of the pilot signals by calculating the ratio between the levels of the pilot signals recorded on the two tracks at both sides of the track to be traced, it is possible to quickly effect tracking on the magnetic head in a short period of time.

Also, since the resolution of the value of the ratio between "the A/D-converted value of the reproducing head 1A" and "the A/D-converted value of the reproducing head 1B" relative to the off-track amount becomes equal regardless of the direction of the off-track of the magnetic head and in addition, the large resolution can be obtained, highly-precise tracking can be effected on the magnetic head regardless of the direction of the off-track of the magnetic head.

Further, it is possible to quickly and easily judge the off-track amount of the magnetic head by using the table 25 in which the value of this ratio and the off-track amount are stored in correspondence with each other.

Furthermore, since it is sufficient to provide the band pass filter 18 and the envelope detecting circuit 19 of one system in order to detect the envelope level of the pilot signal with only one kind of frequency, as compared with the case in which there are provided the band pass filters 6, 7 and the envelope detecting circuits 8, 9 of the two systems like the tracking system which has been described so far as the related-art example with reference to FIG. 1, it is possible to effect tracking on the magnetic head by the simple hardware.

In the tracking system according to the present invention, part of or whole of the arrangement from the switch 21 to the table 25 shown in FIG. 3 may be realized by software that is to be executed by a microprocessor.

Figure 2:
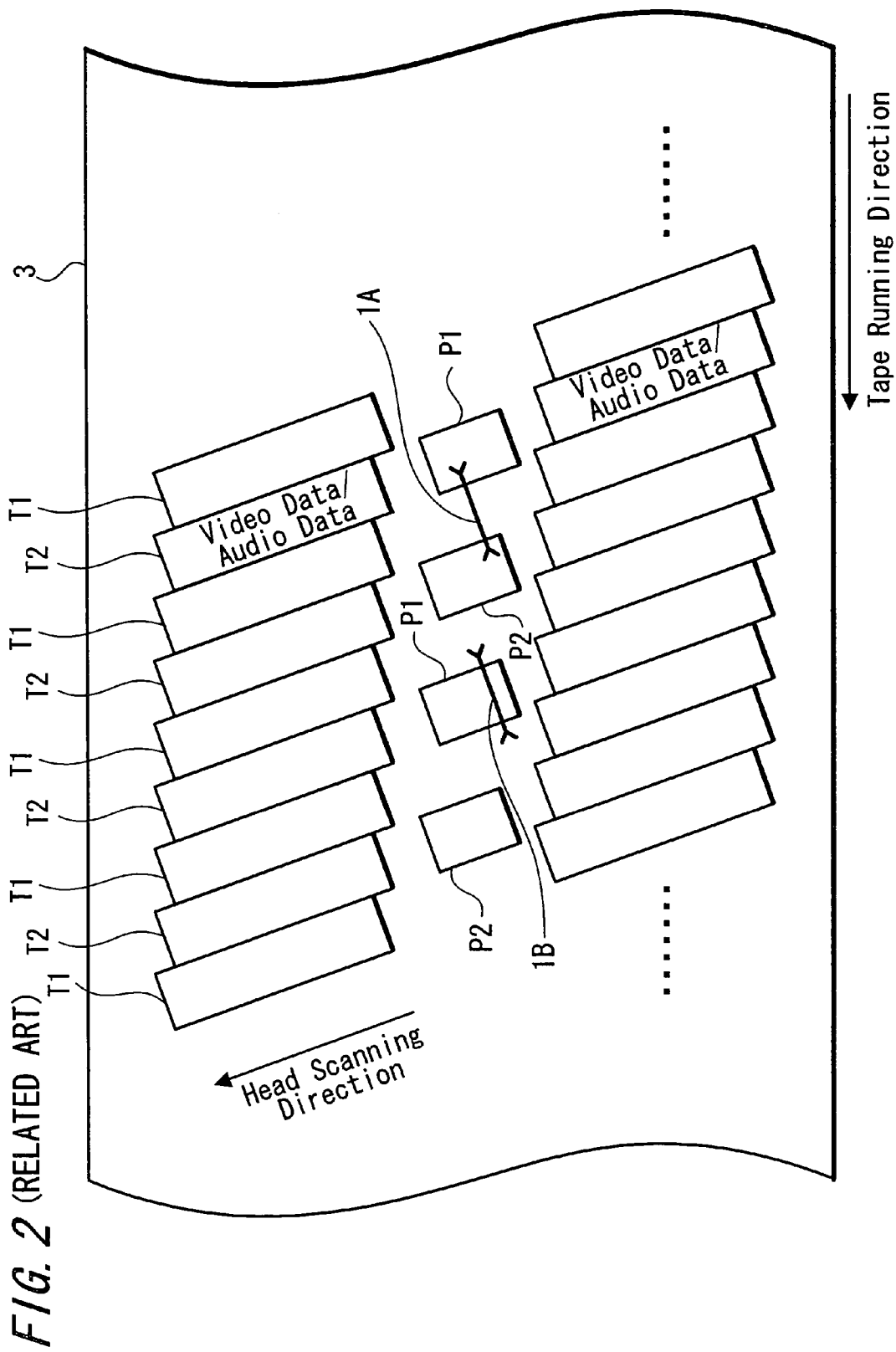
FIG. 2 is a diagram showing the manner in which pilot signals are reproduced from tracks on a magnetic tape by the tracking system shown in FIG. 1.

In the above-mentioned embodiment, the present invention is applied to the VCR that can reproduce the magnetic tape in which the pilot signal with the frequency of only one kind is recorded as shown in FIG. 4. However, the present invention is not limited thereto, and the following variant is also possible. That is, in the VCR for reproducing the magnetic tape in which the pilot signals with the frequencies of two kinds are recorded like the related-art example shown in FIG. 2, the ratio between the envelope levels of the pilot signals with the two frequencies (the ratio between the output of the A/D converter 10 and the output of the A/D converter 11 shown in FIG. 1) may be calculated and tracking may be effected on the magnetic head in response to the off-track amount judged from the value of that ratio. According to this variant of the arrangement, it becomes, of course, possible to quickly effect tracking on the magnetic head in a short period of time.

Conversely, in the tracking system shown in FIG. 3, a difference between the A/D-converted value ("the A/D-converted value of the reproducing head 1A") stored in the register 22 after it has been outputted from one output terminal 21a of the switch 21 and the A/D-converted value ("the A/D-converted value of the reproducing head 1B") outputted from the other output terminal 21b of the switch 21 may be calculated by a subtracter and the output from this subtracter may be supplied to the low-pass filter 13 and thereby the tracking error signal may be generated. Also in that case, since it is sufficient to provide the band pass filter 18 and the envelope detecting circuit 19 of one system in order to obtain the envelope levels of the pilot signals, it is possible to effect tracking on the magnetic head by the simple hardware.

Furthermore, while the present invention is applied to the VCR in the above-mentioned embodiment, the present invention is not limited thereto, and may be applied to all sorts of reproducing apparatus which can trace the tracks on the tape-like recording medium by a magnetic head.

According to the present invention, in the reproducing apparatus in which the tracks on the tape-like recording medium are traced by the magnetic head, since the practical value of the off-track amount can be judged by calculating the ratio between the levels of the pilot signals recorded on the two tracks at both sides of the track to be traced regardless of the level of the pilot signal, there can be achieved an effect in which tracking can be effected on the magnetic head quickly in a short period of time.

Also, since the resolution of the value of the ratio relative to the off-track amount becomes equal regardless of the direction of the off-track of the magnetic head and in addition the large resolution can be obtained, there can be achieved an effect in which highly-precise tracking can be effected on the magnetic head regardless of the direction of the off-track of the magnetic head.

Further, by using the table in which the values of the ratios and the off-track amounts are stored in correspondence with each other, there can be achieved an effect in which the off-track amount can be judged quickly and easily.

Furthermore, since it is sufficient to provide only the detecting means of one system in order to detect the level of the pilot signal with the frequency of only one kind, there can be achieved an effect in which tracking can be effected on the magnetic head by the simple hardware.

Having described preferred embodiments of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A reproducing apparatus for tracing tracks on a tape-like recording medium by a magnetic head, comprising:

detecting means for detecting levels of pilot signals recorded on tracks from a reproduced signal reproduced by said magnetic head;

calculating means for calculating a ratio between levels detected by said detecting means with respect to pilot signals recorded on two tracks at both sides of a track to be traced by said magnetic head; and judging means for judging an off-track amount of said magnetic head from a value of the ratio calculated by said calculating means, wherein tracking is effected on said magnetic head in response to the off-track amount judged by said judging means, wherein said calculating means calculates a ratio of levels detected by said detecting means with respect to the pilot signals recorded on said two tracks at both sides of said track such that a smaller level becomes a denominator.

2. A reproducing apparatus according to claim 1, wherein said judging means comprises a table in which the value of said ratio and said off-track amount are stored in correspondence with each other.

3. A reproducing apparatus for tracing tracks on a tape-like recording medium by a magnetic head, comprising:

detecting means for detecting levels of pilot signals recorded on tracks from a reproduced signal reproduced by said magnetic head;

calculating means for calculating a ratio between levels detected by said detecting means with respect to pilot signals recorded on two tracks at both sides of a track to be traced by said magnetic head; and judging means for judging an off-track amount of said magnetic head from a value of the ratio calculated by said calculating means, wherein tracking is effected on said magnetic head in response to the off-track amount judged by said judging means, wherein said tape-like recording medium has recorded thereon a pilot signal with a frequency of only one kind in such a pattern that pilot signals exist only on a track of one side of two tracks at both sides of a track to be traced when one magnetic head of two magnetic heads disposed on a rotary drum in an opposing fashion traces a track and that pilot signals exist on the opposite track of two tracks at both sides of said track to be traced when the other magnetic head traces a track;

said magnetic head comprises two magnetic heads disposed on a rotary drum in an opposing fashion, said detecting means comprises only detecting means for detecting a level of said pilot signal component with the frequency of only one kind; and said reproducing apparatus further comprises:

holding means for holding a level detected by said detecting means with respect to the pilot signal recorded on the track of one side until the level of the pilot signal recorded on the track of said opposite side is detected by said detecting means and said calculating means calculates a ratio between the level held by said holding means and the level detected by said detecting means with respect to the pilot signal recorded on the track of said opposite side.

4. In a magnetic head tracking method in a reproducing apparatus for tracing tracks on a tape-like recording medium by a magnetic head, a tracking method comprising the steps of:

a first step for detecting levels of pilot signals recorded on tracks from a reproduced signal reproduced by said magnetic head;

a second step for calculating a ratio between the levels detected at said first step with respect to the pilot signals recorded on two tracks at both sides of the track to be traced by said magnetic head;

a third step for judging an off-track amount of said magnetic head from a value of a ratio calculated at said second step; and a fourth step for effecting tracking on said magnetic head in response to the off-track amount judged at said third step wherein said second step calculates a ratio between the pilot signals recorded on said two tracks in such a manner that a smaller level of the levels detected at said first step becomes a denominator.

5. A tracking method according to claim 4, wherein said third step judges said off-track amount with reference to a table in which the value of said ratio and said off-track amount are stored in correspondence with each other.

6. In a magnetic head tracking method in a reproducing apparatus for tracing tracks on a tape-like recording medium by a magnetic head, a tracking method comprising the steps of:

a first step for detecting levels of pilot signals recorded on tracks from a reproduced signal reproduced by said magnetic head;

a second step for calculating a ratio between the levels detected at said first step with respect to the pilot signals recorded on two tracks at both sides of the track to be traced by said magnetic head;

a third step for judging an off-track amount of said magnetic head from a value of a ratio calculated at said second step; and a fourth step for effecting tracking on said magnetic head in response to the off-track amount judged at said third step, wherein said tape-like recording medium has recorded thereon a pilot signal with a frequency of only one kind in such a pattern that pilot signals exist only on a track of one side of two tracks at both sides of a track to be traced when one magnetic head of two magnetic heads disposed on a rotary drum in an opposing fashion traces a track and that pilot signals exist on the opposite track of two tracks at both sides of said track to be traced when the other magnetic head traces a track;

said magnetic head comprises two magnetic heads disposed on a rotary drum in an opposing fashion, said first step detects a level of said pilot signal component with the frequency of only one kind; and in which said tracking method further includes a fifth step for holding a level detected at said first step with respect to the pilot signal recorded on the track of one side until the level of the pilot signal recorded on the track of said opposite side is detected at said first step and said second step calculates a ratio between the level held at said fifth step and the level detected at said first step with respect to the pilot signal recorded on the track of said opposite side.

* * * * *